Jan. 7, 1936.                    D. W. MASON                    2,027,282
                                  TIRE AND RIM
                                Filed Jan. 2, 1935
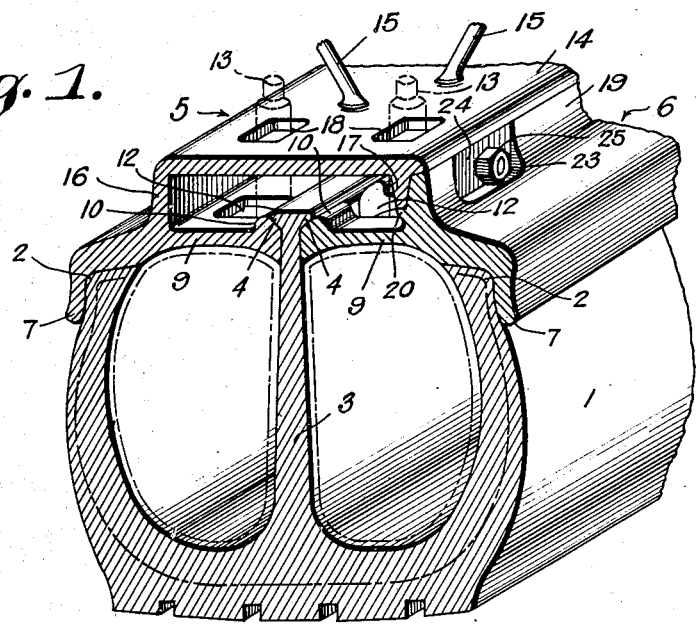
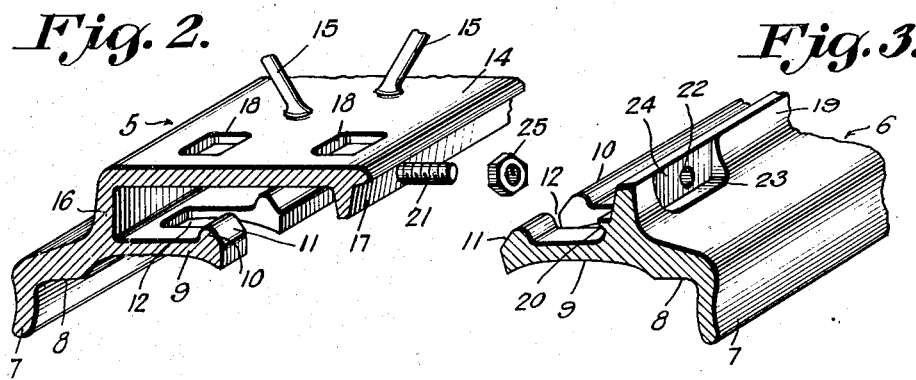
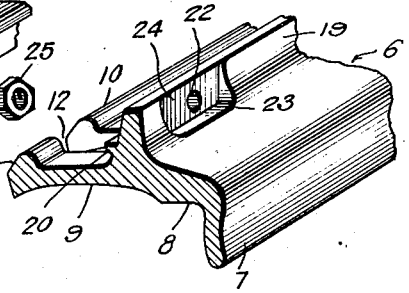
Donald W. Mason,
INVENTOR Patented Jan. 7, 1936

2,027,282

UNITED STATES PATENT OFFICE 2,027,282

TIRE AND RIM

Donald W. Mason, Eugene, Oreg.

Application January 2, 1935, Serial No. 144

3 Claims. (Cl. 152—22)

It is the object of the present invention to provide a tire and rim construction which will facilitate changing of a tire when necessary; which will reduce the liability to accident and damage from blow-outs, punctures and tire failures, and to increase durability. An embodiment of the invention is illustrated in the accompanying drawing and will be hereinafter fully described, the novel features being defined in the appended claims.

In the drawing:

Figure 1 is a transverse section, in perspective, of the tire and rim structure.

Figures 2 and 3 are similar perspective views of the rim members.

The tire 1 is formed of rubber and canvas in the usual manner with beads 2 along its edges. According to the present invention, the tire is provided with a central wall or partition 3 which tapers from the tread portion of the tire and is formed at its edge with beads or flanges extending the full length of both its sides, two tube-receiving chambers being thus formed.

The rim is constructed in two sections 5 and 6, each section having a flange 7 along its outer edge against which a bead of the tire will seat, and it will be noted that the inner surface of the rim section adjacent the flange provides a transverse seat 8 for the edge of the tire, the width of the seat being the same as the width of the tire edge. At the inner side of the tire seat is a transversely concave surface 9 which, adjacent the tire seat, is flush with the wall of the tire to avoid pinching of the inflation tube which is disposed within the respective chamber of the tire. Along the inner edge of the rim section, on its inner circumference, is a bead, rib or flange 10 the inner surface of which is beveled, as shown at 11, whereby it may engage under the corresponding bead or flange 4 on the partition or wall 3 of the tire, as shown in Figure 1. When the two rim sections are secured together, the end of the partition will be firmly clamped by and between the sections, as will be understood. Both rim sections have openings or notches 12 in their edges to accommodate the inflation valves, indicated at 13, on the tubes housed in the respective chambers of the tire.

The major rim section 5 is constructed with an inner rim or felly band 14 to which the spokes 15 are secured in any approved manner. This band, at its outer edge, is formed integral with a rib 16 on the main body of the rim section whereby it is spaced from the outer partition-clamping band or member. The inner band extends across and beyond the edge of the partition 3 in spaced relation thereto and near the free edge of the band, on its outer circumference, is a rib 17. The band 14 overhangs the minor rim section 6 and is provided with openings 18 alined with the notches 12 whereby the inflation valves are accommodated and are accessible when inflation of the tire is needed. The minor rim section has a rib 19 formed thereon and on the side of the rib presented to the major section is a ledge or shoulder 20 upon which the edge of the rib 17 will rest, the side of the rib 17 abutting the side of the rib 19 and the overhanging edge of the band 14 resting on the edge of the rib 19, as clearly shown in Figure 1.

A threaded stud or lug 21 projects from the rib 17 to pass through an opening 22 in the rib 19, and around said opening a shallow recess 23 is formed in said rib to furnish a plane wall 24 against which a nut 25 may be turned home on the stud 21 to secure the rim sections together.

In assembling the tire and rim, the tubes are placed in the respective chambers of the tire and partially inflated. The tire is then slipped over the major rim section until its bead seats against the flange of the rim and the end of the partition 3 engages upon the bead 10, the stem of the near inflation valve passing into the notch or slot 12 and being pushed up through the opening 18. The second valve stem is then pushed up through the second opening 18 and thereafter the minor rim section is brought into position, the notch or slot 12 passing around the second valve stem, the stud 21 passing through the opening 22 and the rib 19 seating against the rib 17 and under the edge of the band 14. The nut 25 is then turned home, securing the parts together.

It is highly improbable that both compartments of the tire will be deflated at the same time as a result of puncture or other unforeseen cause. Hence, the factor of safety is high. Should one chamber be deflated through a blow-out or other accident, the other half of the tire will carry the load and the car will remain under complete control, as before the accident. When the ordinary tire is turning at high speed, centrifugal force stretches the material in the tire which appreciably weakens the tire and shortens its life, but in my tire the central partition, firmly clamped between the rim sections, reenforces the tire and minimizes the centrifugal stretch, thereby prolonging the life of the tire, increasing mileage and reducing costs. Should one side of the tire be deflated, the operator may proceed at moderate speed until he gets out of congested traffic or reaches a repair station without damage or strain to either tire or rim.

Having described my invention, what I claim is:

1. In a tire and and rim section, a tire having a central partition and inflation chambers at the sides of the partition, rim sections engaging the tire at the sides of the same and having outer bands clamping the partition and supporting inflation tubes in the tire, said bands each having an opening for an inflation valve stem, a rib on one section, an inner felly band on the other section having openings for inflation valve stems, a rib on said felly band interfitting with the first named rib, and means carried by both ribs to secure the sections together.

2. In a tire and rim section, a tire having a central partition and inflation chambers at the sides of the partition, rim sections engaging the tire at the sides of the same and having outer bands clamping the partition and supporting inflation tubes in the tire, one of the sections having an inner felly band, a rib on the outer circumference of said felly band near the edge thereof, a rib on the other rim section to engage under the edge of the felly band and abut the rib thereof, a ledge on the second named rib engaging under the felly band rib, and means carried by both ribs to secure the sections together.

3. In a tire and rim section, a tire having a central partition and inflation chambers at the sides of the partition, said partition being provided with flanges along its sides at its edge, rim sections engaging the tire at the sides of the same and having outer bands provided at their opposed edges with bevelled ribs engaging under the flanges on the partition, said bands each having an opening for an inflation valve stem, a rib on one rim section, an inner felly band on the other rim section having openings for inflation valve stems, a rib on said felly band interfitting with the first named rib, and means carried by both of the interfitting ribs to secure the rim sections together.

DONALD W. MASON.